(12) United States Patent
Matthews et al.

(10) Patent No.: US 6,865,268 B1
(45) Date of Patent: Mar. 8, 2005

(54) DYNAMIC, REAL-TIME CALL TRACKING FOR WEB-BASED CUSTOMER RELATIONSHIP MANAGEMENT

(76) Inventors: Charles Terence Matthews, 1090 Brittwood Pl., Norcross, GA (US) 30093; John Michael Domjancic, 2500 Pleasant Hill Rd., Apt. 203, Duluth, GA (US) 30096

( * ) Notice: Subject to any disclaimer, the term of this patent is extended or adjusted under 35 U.S.C. 154(b) by 627 days.

(21) Appl. No.: 10/051,477

(22) Filed: Jan. 16, 2002

Related U.S. Application Data (60) Provisional application No. 60/261,421, filed on Jan. 16, 2001.

(51) Int. Cl.[7] .............................................. H04M 3/00
(52) U.S. Cl. ............................. 379/265.09; 379/88.17; 379/265.02
(58) Field of Search ........................ 379/88.17, 265.01, 379/265.02, 265.09; 709/204

(56) References Cited

U.S. PATENT DOCUMENTS

| | | | | |
|---|---|---|---|---|
| 5,884,032 A | * | 3/1999 | Bateman et al. ............ | 709/204 |
| 5,974,135 A | * | 10/1999 | Breneman et al. ..... | 379/265.04 |
| 6,188,761 B1 | * | 2/2001 | Dickerman et al. .... | 379/265.01 |
| 6,219,648 B1 | | 4/2001 | Jones et al. ..................... | 705/8 |
| 6,272,216 B1 | | 8/2001 | Vaios .......................... | 379/265 |
| 6,347,139 B1 | | 2/2002 | Fisher et al. ........... | 379/265.12 |
| 6,353,446 B1 | * | 3/2002 | Vaughn et al. .............. | 715/733 |
| 6,356,632 B1 | | 3/2002 | Foster et al. ........... | 379/265.04 |
| 6,377,944 B1 | | 4/2002 | Busey et al. .................... | 707/3 |
| 6,381,640 B1 | | 4/2002 | Beck et al. ................. | 709/223 |
| 6,516,055 B1 | * | 2/2003 | Bedeski et al. .......... | 379/32.01 |

* cited by examiner

*Primary Examiner*—Bing Q. Bui
(74) *Attorney, Agent, or Firm*—Womble Carlyle Sandridge and Rice, PLLC (57) ABSTRACT

A method and computer product for locating and tracking the status of call tickets, communicating both asynchronously and synchronously with online members within an organization through an interactive, web-based, on-call board application. Members are provided with access to static and dynamic organizational information with a multi-level access control. An on-call board display is driven by preset permissions, department settings, and member inputs. A member of the organization selects status options and inputs information that dynamically drives the on-call board for each refresh cycle. Members are set to different permission levels, thereby controlling access to various icons, links, features or functions. The display of the number of call ticket requests for a listing of members is integrated into the on-call board. This integration further allows for a visual display of current tickets that are assigned to each member. A float board provides links to electronic mail and phone numbers for each individual member. A dynamic mailing list enables instant selection of mailing recipients through a member sorting template. Customer feedback scoring is automatically generated for each member based on the satisfaction feedback input received from customers on closed call tickets.

29 Claims, 8 Drawing Sheets

| LEVEL | STAFF NAME | SATISFIED | | RESPONSE TIME | | | SCORE |
|---|---|---|---|---|---|---|---|
| | | Yes | No | E | S | P | |
| ADM | Charles Matthews | 22 | 8 | 15 | 5 | 10 | 0.61 |
| ADM | Doug Earp | 0 | 0 | 0 | 0 | 0 | 0 |
| ADM | Gibson | 0 | 0 | 0 | 0 | 0 | 0 |
| ADM | Jason Gibson | 13 | 9 | 10 | 8 | 4 | 0.61 |
| ADM | John Domjancic | 6 | 12 | 6 | 7 | 5 | 0.41 |
| ADM | SECURITY SVCS | 0 | 0 | 0 | 0 | 0 | 0 |
| ADM | SP | 0 | 0 | 0 | 0 | 0 | 0 |
| ADM | TENANT SVCS | 0 | 0 | 0 | 0 | 0 | 0 |
| MGR | Dorothy Popovski | 0 | 0 | 0 | 0 | 0 | 0 |
| MGR | Ken Kramer | 0 | 0 | 0 | 0 | 0 | 0 |
| MGR | Rosa Baudry | 0 | 0 | 0 | 0 | 0 | 0 |
| MGR | Stan Zeldin | 0 | 0 | 0 | 0 | 0 | 0 |
| MGR | Tom Watson | 0 | 0 | 0 | 0 | 0 | 0 |
| TSR | Robin Matthews | 0 | 1 | 0 | 0 | 1 | 0 |
| TSR | test User | 0 | 0 | 0 | 0 | 0 | 0 |
| CSR | JANITORIAL SVCS | 0 | 0 | 0 | 0 | 0 | 0 |
| | TOTAL | 41 | 30 | 31 | 20 | 20 | 0.56 |

DYNAMIC, REAL-TIME CALL TRACKING FOR WEB-BASED CUSTOMER RELATIONSHIP MANAGEMENT

CROSS REFERENCE TO RELATED APPLICATIONS

The present patent application is a formalization of a previously filed, co-pending provisional patent application entitled "Enterprise Class, Web-Based CRM Software Application with Dynamic and Real-time On-Call Board GUI/Portal Interface ", filed Mar. 16, 2001, as U.S. patent application Ser. No. 60/261,421 by the inventors named in this patent application. This patent application claims the benefit of the filing date of the cited provisional patent application according to the statutes and rules governing provisional patent applications, particularly USC § 119(e)(1) and 37 CFR §§ 1.789(a)(4) and (a)(5). The specification and drawings of the provisional patent application are specifically incorporated herein by reference.

BACKGROUND OF THE INVENTION

The present invention is generally related to electronic customer relationship management (eCRM) applications. More particularly, the present invention relates to a method and system for providing real-time call tracking and resolution management,

SUMMARY OF THE INVENTION

The present invention provides a method and computer product for locating and tracking the status of call (e.g., trouble) tickets, and communicating asynchronously and synchronously with online members or employees within an organization through an interactive, web-based, on-call board application. Employees are provided with access to static and dynamic organizational information with a multi-level access control. Automatic scoring of employees handling a call ticket is based on customer satisfaction feedback.

An On-Call Board provides a logical grouping of functions and features that are intuitive to the end user. The On-Call Board display, including a plurality of JavaScript links, is driven by preset permissions/location, department setting, and end-user input (status selection, searching, sorting, input of profile details, phone numbers, etc.)

The On-Call Board display is end-user interactive which means that a member or employee of the organization selects status options and inputs information that dynamically drives the On-Call Board on each refresh cycle. Communication options are driven by user input of status information that provides a finer granularity over a simple login trigger. Searching and sorting functions allow the user to select or narrow the display of members. End users are set to different permission levels, thereby controlling access to various icons, links, features or functions. The display of the number of call ticket requests for a listing of employees is integrated in the On-Call Board. This integration in the On-Call Board allows for a visual display of current tickets that are assigned to each employee. Each refresh of the On-Call Board updates this count.

A Dynamic Phone List allows each employee to update or change the phone number where he can be reached at any given time. This selected number then automatically populates the On-Call Board.

A Float Board provides links to email and phone numbers for each individual on the Float Board for an individual member. The display of the list is driven by the On-Call Board engine and not from simply being logged in. There is no need for any client (i.e., customer) software.

A Dynamic Mailing List allows for instant selection of mailing recipients through sorting and is not static.

A Customer Feedback scoring report is automatically generated for each employee according to the satisfaction feedback inputs from all customers. This provides an overall measure of each employee's performance.

An Automated Satisfaction Indicator on a Closed Tickets Log, automatically inserts an icon next to the ticket number, which represents the customer's satisfaction feedback for that specific closed ticket.

An eNote function allows for near instant updates of the Inbox column on the On-Call Board. It requires no email application to read the posted note.

DESCRIPTION OF THE DRAWINGS

The invention is better understood by reading the following detailed description of an exemplary embodiment in conjunction with the accompanying drawings.

DETAILED DESCRIPTION OF THE INVENTION

The present electronic Customer Relationship Management (eCRM) portal engine invention provides call tracking management with interactive end-user tools that allows the enduser, whether a potential customer, customer, or an employee to submit service/call requests via the web, e-mail, and/or telephone. The eCRM portal engine is completely web-based and installed at an organization web portal for access by members (employees) and customers of the organization. Its control and use is exercised entirely from a web browser application, with no need for client software. The ECRM portal engine allows the end-user (customer) to track his assigned ticket or call status and provide customer feedback on the service received that completes the life cycle of the call request. The ticket closer is then numerically rated with a scoring algorithm on each and all tickets closed with the feedback submitted by the customer. This software solution provides fill life cycle support for call tracking and resolution management by integrating web, e-mail and telephonic contact with not only customers and business partners, but also between employees within an organization. The ECRM portal engine creates powerful capabilities for managing and accessing both static and dynamic organizational information, performing processes and tasks cross-departmentally, geographically and at all hierarchy levels. Uniform and logical presentation of tasks, functions, and information allows employees within the organization to work effectively in responding to customer calls. The employee can intelligently share valuable customer and organizational knowledge across the enterprise-from sales and marketing, to service and support, to product development, and to management and administration. Security is assured and access to the ECRM portal engine functions and features is flexibly controlled by setting each member's permissions for each function or feature of the system.

Three elements of the eCRM portal engine work together to deliver scalable, enterprisewide call management:

1. a database center element provides a centralized repository for tracking all customer call information, action taken and special technician notes to resolve problems with date, time and reference number. The database center element also provides for the flexibility to allow multiple customers to be supported on one common server. Call information can be archived to maintain a historical record of all customer interactions. The database center provides for real-time call activity reports that track call duration and count by call type and assigned employee, assisting management in tracking workflow performance. Also, customer feedback reports are provided to assist management in tracking customer satisfaction levels and defining benchmark performance measurements. The database center element is highly customizable which also lends itself to a high degree of legacy application integration.

2. a process technology element enables audit trails, permission level assignment, call routing management, automated escalation and real-time reporting of tasks, data and events across all departments, locations and hierarchy levels. A high degree of automation is built into processes eliminating inefficiencies. The process technology element is highly configurable, allowing management to create workflow routines. Call routing tables are created based on category type and groups to better assist in the routing and assignment of call tickets to the appropriate personnel for resolution.

3. a universal interface creates convenient, custom interfaces for an organization's employees and customers. Multiple applications are combined into one user interface that allows for web, e-mail, chat and phone collaboration. Uniform and logical presentation of tasks, functions and information reduces training costs and allows employees to work effectively. Valuable customer information can be shared across the web from anywhere at any time.

There are four portals associated with the ECRM engine:

1. Customer Portal: a personalizable, web-based feature that enables online customer interaction by using the most convenient touch point (i.e., web, e-mail, phone). The following features are provided by the customer portal:

a. Online Service provides customers with the ability to submit a trouble ticket or a request for service online with full life-cycle updates regarding status information and resolution.
   b. Customer Feedback automatically enables customers to provide online feedback on each call regarding quality of service, speed to resolution of problems and general comments.
   c. Customer Registration and Profile Management provides for automatic online membership registration, login authentication and lost password finder. This feature also allows customers to update their own profile information online.
   d. E-mail Management provides an integrated e-mail routing engine that automatically routes, prioritizes and escalates inbound e-mails from customers.
   e. Web Self-help provides an integrated knowledge base and dynamic frequently asked questions (FAQs) that empower customers to solve their own problems.

2. Employee Portal: an enterprise-wide web-based solution that combines robust call management functionality, resource management, collaboration and communications tools, and relevant Internet content thereby maximizing the efficiency of service teams. The following features are provided by the employee portal:

a. Call Management Functionality: support organizations can resolve service inquires as well as seamlessly manage service queues and monitor customer satisfaction. The ticket database can be viewed or searched by ticket number, status, priority, category/problem type, original ticket owner, support person assigned or by customer name. This feature provides full life cycle tracking of calls from call submission to problem resolution. Completed or closed calls can be "reopened", without losing case history information. Each call ticket enables a direct link to customer profile information to assist in trouble resolution.
   b. Resource Management: integrates complementary applications into a single interface so employees no longer have to open and close multiple applications to access the information they need. The eCRM portal engine provides for a unique "On-Call Board Directory", upon employee login that allows quick and real-time visibility to new and open call assignments, plus visibility to other staff members' availability. A staff attendance log automatically tracks when a staff member logs in, changes work status or logs out. The On-Call Board can be searched quickly for those staff members that are online versus off-line. The "On-Call Board Directory", enables sorting or searching for staff members based on name, location, group or department.
   c. Collaboration and Communication Tools: integrates e-mail, phone, e-page and chat capabilities into an all-in-one communications portal enabling any staff member to be reached at any time. The "On-Call Board Directory", provides for quick visibility to a staff member's status, including contact and profile information. An integrated bulletin board and daily message board is provided for keeping staff members informed. Also, a calendar option that enables the posting of future calendar events, eliminating the need for having to send company wide e-mail notifications. A dynamic e-mail distribution generator features allows quick and easy creation of distribution lists.

3. Management Portal provides a web-based interface solution that enables resource tracking, management of staff members and real-time performance measurements of service team members. The following features are provided by the management portal:
   a. Staff Directory Administration provides management with the ability to add, change and delete staff profile information and to assign username and password access to the eCRM portal platform. Profile information also includes company name, job title, address, telephone, location and department information.
   b. Category Assignment provides management with the ability to assign and automatically route different requests for service to either a unique individual, department, group or location based on type of issue or problem. This feature also enables automatic priority assignment (i.e., normal, high, and urgent) for new service requests and automatic e-mail or pager notification based on category type.
   c. Bulletin Board Administration integrates a bulletin board function that enables the organization's management to post news alerts of future events or issues to keep all employees informed, thus eliminating the need for sending mass e-mail broadcast notifications to employees.
   d. Staff Attendance Tracking automatically tracks when a staff member logs in, changes work status or logs out. The organization's management can quickly and easily search and download the attendance log for a particular staff member, group, department, or location by date range.
   e. Performance Reports provide the organization's management with real-time performance measurements for tracking trends and setting benchmarks for improving quality of service.
4. Admin Portal is a web-based interface that allows for system setup and administration of database tables. The following tables are maintained and administered by the system administrator:
   a. Category Listing and Administration enables the system administrator to add, change and delete category definitions used for assigning and tracking requests for service, based on type of problem or issue.
   b. System Status Update enables the system administrator to notify staff members of system status.
   c. Archive Closed Tickets enables the system administrator to archive closed tickets and backup to a different database. Archived records are not included in the count and averages generated within the real-time reporting system.
   d. Location and Department Administration enables the system administrator to add, change and delete location definitions (i.e., by region, city, state, etc.) and department definitions (i.e., sales, marketing, service, support, etc.) used when adding and assigning staff members.
   e. Role Administration enables the system administrator to add, change or delete roles, whereby employees and management can then be assigned to a unique grouping based on job title, responsibility or type of work.
   f. Permissions Administration enables the system administrator to add, change or delete permission levels for each table (i.e., read only, write, or no access).

Figure 1:
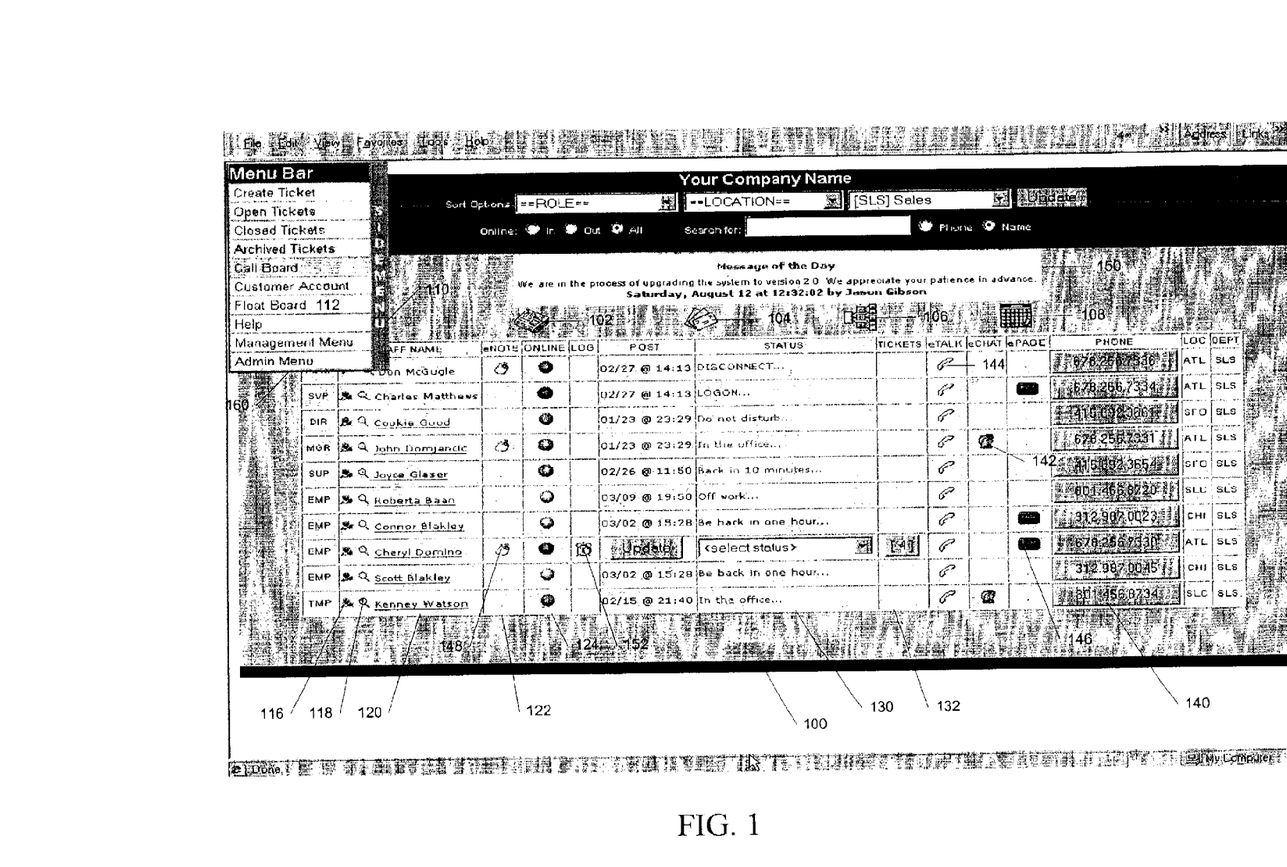
FIG. 1 illustrates an On-Call Board graphical user interface in accordance with an exemplary embodiment of the present invention.

As illustrated in FIG. 1, the eCRM portal engine provides a unique and powerful "virtual", On-Call Board 100 that allows On-Call Board members both quick and real-time visibility to each member's availability and ticket/call assignment. This powerful "quick contact", center is also an all-in-one communication portal where members are intelligently presented with multiple contact channels/options to efficiently reach other members. After a secure login, the eCRM portal engine's "start page", the On-Call Board 100, serves as an enterprise-level real-time communication portal to the system and a quick jumping off point after login to various functions and real-time representations of the "systems", status. Real-time status updates are generated when the On-Call Board window 100 automatically refreshes at a presettable rate. The On-Call Board 100 allows the organization's staff to gain a quick overview of who is "available", and the associated status for each staff member. The On-Call Board engine then automatically generates the appropriate communication channels/options according to the availability status of the call board member. If a member's status 130 is "in the office", and the member is logged into the system, the chat (instant messaging) and voice over IP icons will be displayed in the On-Call Board listing. The On-Call Board 100 can also be used to view different groupings of members depending on the member's role, location, and the department that members have been assigned to by sorting the drop down lists or searching the members' directory. The On-Call Board 100 provides dynamic multiple contact information and channels (email, chat, voice over IP, pager, phone contact information) by simply clicking on either the "staff name", 120 for email contact, the e-page icon 140 for paging, the chat icon 142 for instant messaging, the talk icon 144 for voice calls over the IP network, or the phone button (column 140) for a list of phone contact information where members select the primary phone number where they can be reached (i.e. home, office, cell). Members can also get a quick tally of the tickets/calls/requests that are assigned to them by the number displayed in the "Tickets", column 132. By clicking on the phone number button, the member can view his assigned open tickets, which have been automatically routed to that member based on that member's expertise or category assignment. The system automatically logs each individual's system "status", (i.e., logged in, online, logged off, or disconnected). For security purposes, members can be automatically disconnected from the system after a predetermined perod of inactivity. Each individual member selects his respective availability "status", (column 130) from a drop down list to notify others of his current availability, and thus the appropriate means to quickly contact him. This selection also drives the On-Call Board engine to display the appropriate contact options/channels. Each member is limited to only selecting his own status. When a member selects an "Out", availability status (i.e. "off work,", "be back in one hour,", "on vacation,", etc.), that member is automatically logged out of the system.

The "Message of the Day", text box 150 depicted in FIG. 1 allows an administrator to alert or notify all On-Call Board members with an instantly visible message.

Figure 2:
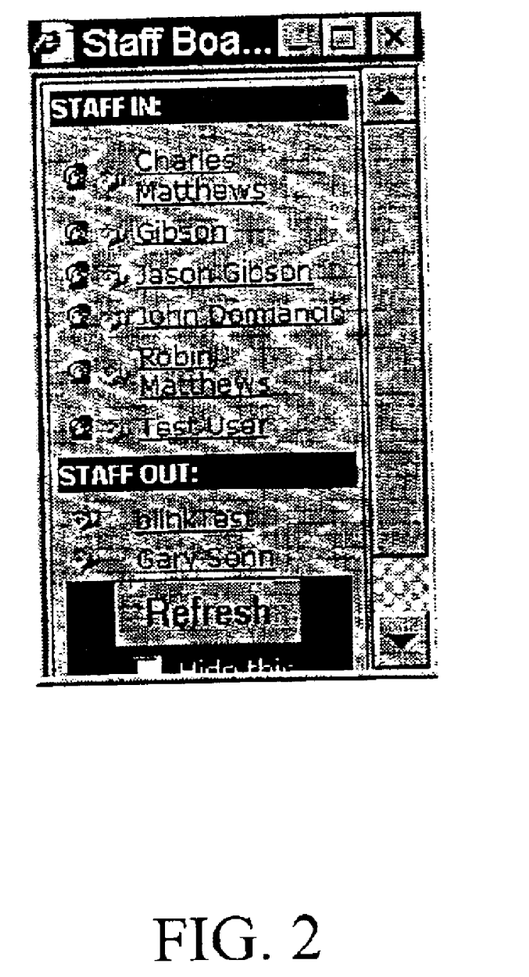
FIG. 2 illustrates a Float Board for presenting a member's status in accordance with an exemplary embodiment of the present invention.

The "Float Board", 112 on the Dynamic Permission Menu 160 can also be activated from the On-Call Board 100. Shown in FIG. 2, the Float Board is a compact windowed listing of selected members that dynamically list previously defined members' "in or out", status. It contains quick contact links (phone, email, chat) without the need for the On-Call Board window 100, shown in FIG. 1, to be open. The Float Board can be set to automatically refresh, check each member's respective status, and return an updated real-time On-Call Board member listing. The Float Board can be set to remain visible over all open windows.

The "Dynamic Permission Menu", 160 located on the On-Call Board window 100 of FIG. 1 and all other system windows contains hyperlinks to the eCRM portal engine application functions. This JavaScript menu is activated by mouse clicking on the "SIDEMENU", 110, which then expands (as shown in FIG. 1), with that member's permission allowable function/feature links. Each link that the member has permission to access is displayed, while the links that the member does not have permission to access are not displayed. The "Create Ticket", link initiates a new call or ticket template. The "Open Tickets", link opens a log of all open calls or tickets that have not been closed. The "Closed Tickets", link opens a log of all completed tickets or calls. The "Archived Tickets", link opens a log of all archived calls or tickets. The "Help", link opens the knowledge base search function. The "Customer Account", link opens the customer search function The "Float Board", link 112 activates the Float Board for the respective member. The "Manager Menu", link accesses a template menu with links to reports, assign category setting, bulletin board management, and member's attendance log. The "Admin Menu", link accesses a template menu, from which an administrator can access and input settings and system information.

Figure 4:
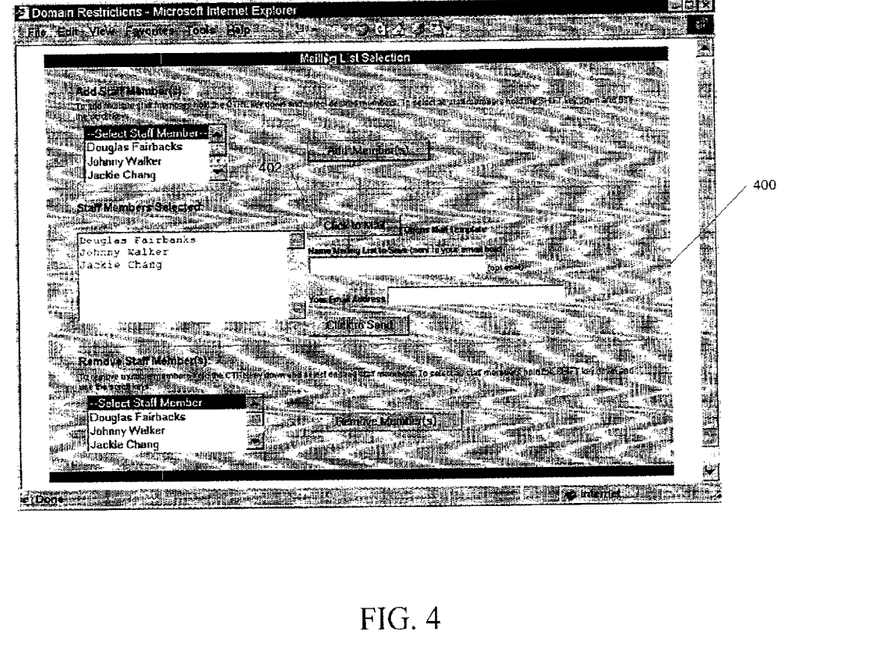
FIG. 4 illustrates a mailing list selection template for selecting members that are to receive a mail message electronically in accordance with an exemplary embodiment of the present invention.

The On-Call Board portal also contains graphically represented hyperlinks that allow access to certain features and functions of the eCRM portal engine system that are described as follows:

1. News icon 102 represents a link to an electronic bulletin board where management can post and append messages, and delete message posts which can be viewed by all members who have access permission.
2. Mail icon 104 represents a dynamic mailing list generator where the sorting or search function controls a selection of members on the On-Call Board. By clicking the mail icon, this On-Call Board listing is sent to a template, as shown in FIG. 4, which is opened and where the mailing list can be further manipulated and saved.
3. Organizational chart icon 106 represents a link to a hierarchical representation of the structure of organizational members.
4. Calendar icon 108 represents a link to an online event calendar where important meetings or events can be viewed by date and time.

Figure 5:
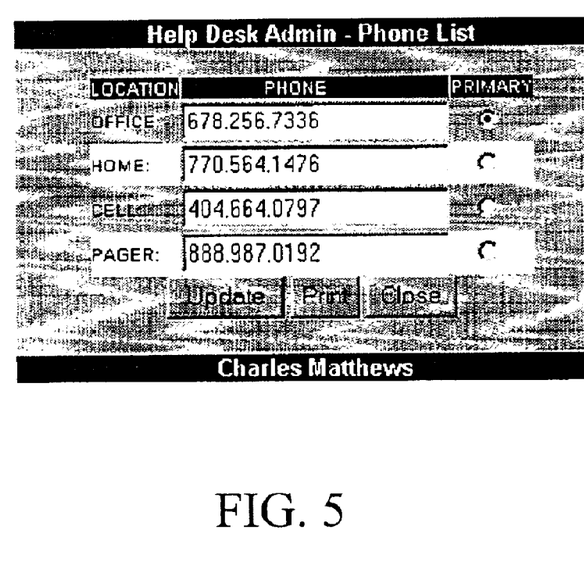
FIG. 5 illustrates a dynamic phone list for an individual member to select a contact number at which he can be reached in accordance with an exemplary embodiment of the present invention.

Several other related icons are illustrated in FIG. 1:

1. Hour Glass icon 118 links to the member's demographic information template, such as position, company, address etc. The Hour Glass icon is next to the member's name in staff name column 120.
2. Online Ball icon 124 represents the member's logged in status. A blue-colored ball indicates the member has logged into the system, but has not selected an availability status. A green-colored ball indicates the member is logged in and selected "in the office", as his availability status. A white-colored ball indicates the member has appropriately logged out of the system. A red-colored ball indicates the member has been automatically disconnected or timed out of the eCRM portal engine system.
3. Clock icon 152 links to a listing of a member's change in availability status. The staff attendance log function automatically generates a log for each staff member including time stamps for each login, online, off-line and log off action.
4. Chat icon 142 initiates a chat or instant-messaging session when a respective member's chat icon is selected.
5. eTalk icon 144 initiates a Voice over IP call session when a respective member's Talk icon is selected.
6. ePage icon 146 initiates a template where a member can send a text message to another member's pager. The e-page icon is visible if that member enables the pager notification feature.
7. eNote icon 116 enables a member to leave an e-note for another member listed on the On-Call Board 100 by selecting the eNote icon 116 next to the other member's name in column 120.
8. Phone button (column 140) displays the contact number where the member is most likely to be reached. The member can click on this button to dynamically select this number from his alternatives as shown in FIG. 5. This selection then populates the Phone button on the next refresh of the On-Call Board 100.
9. eNote icon 148 is indicated in the eNote inbox column 122 when a message is waiting for that individual employee. Once another employee sends a message to the individual employee, an icon 148 is indicated immediately after the On-Call Board refreshes.

Figure 3:
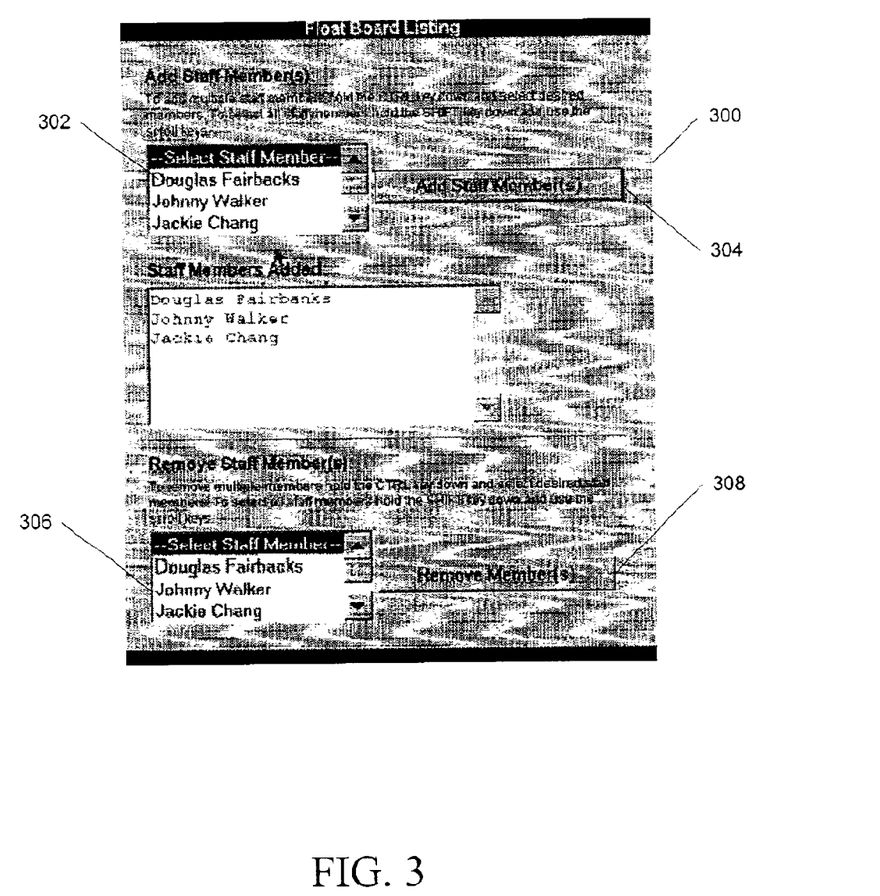
FIG. 3 illustrates a Float Board listing template for defining the members that populate a member's Float Board in accordance with an exemplary embodiment of the present invention.

The Float Board settings for each respective member are selected from the Float Board Listing 300 display illustrated in FIG. 3. This template defines which members populate an individual member's respective Float Board. A member selects which members to add to his Float Board by selecting one or more members 302 and then clicking the "Add Staff Member(s)", button 304 in the "Add Staff Member(s)", section of the display. A member can also be deselected 308 by highlighting the member's name 306 in the "Remove Staff Member(s)", section.

When the Mail icon1 04 in the icon header section of the On-Call Board 100 is selected, a listing of On-Call Board members defined by a sorting of the On-Call Board is sent to the Mailing List Selection template 400 (shown in FIG. 4). This list can be further manipulated by adding or deleting members of the member list generated by the On-Call Board. By clicking on the "Click to Mail", button 402, a mail template is activated where all selected members can be mailed a message electronically. If the member who creates the dynamic mailing list wishes to save this selected mailing list for future use, the member can name this defined list, which then can be mailed to his email inbox electronically.

The Dynamic Phone List illustrated in FIG. 5 is initiated when a member clicks on the button in the Phone column 140 within the On-Call Board 100. A member then can select the primary contact number at which he can be reached. This number is then displayed on the button in the Phone column 140 on the next refresh of the On-Call Board 100.

Figure 6:
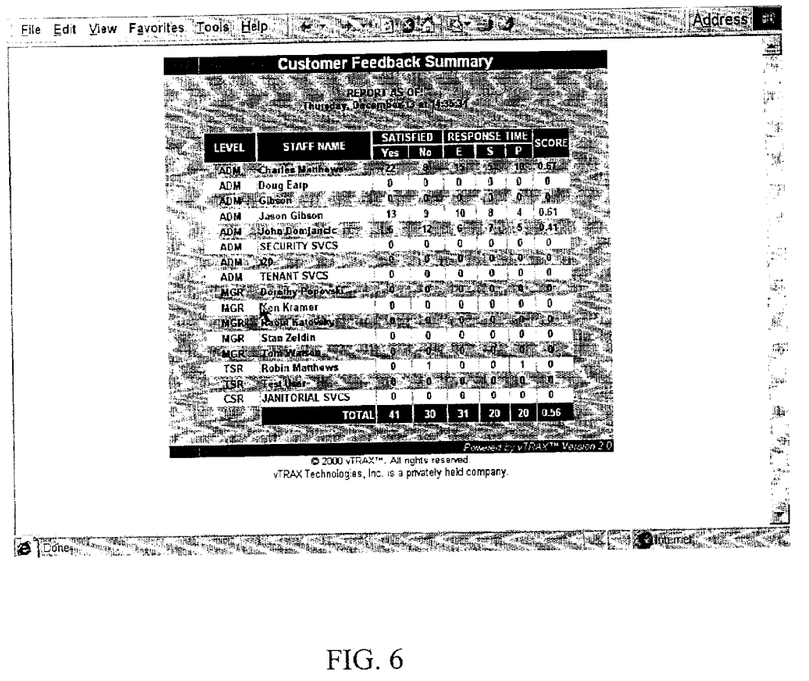
FIG. 6 illustrates a customer feedback scoring report generated from customer responses to closed call tickets in accordance with an exemplary embodiment of the present invention.
Figure 7:
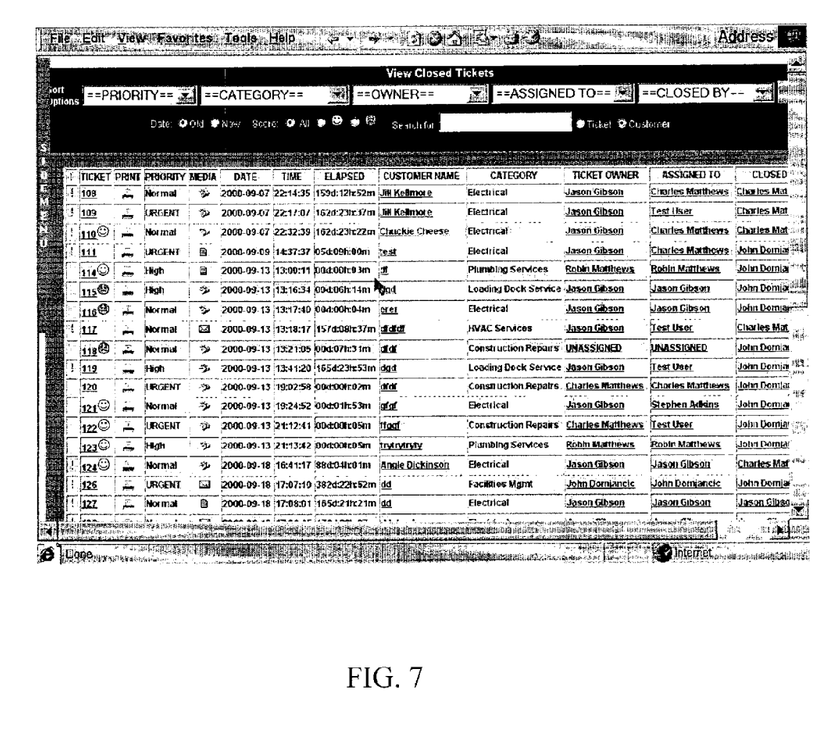
FIG. 7 illustrates a Closed Tickets log in accordance with an exemplary embodiment of the present invention.

The Customer Feedback summary scoring report illustrated in FIG. 6 is generated from customer response on a customer feedback form. An algorithm automatically scores each employee according to the customers' inputs from the forms. The feedback is indicated by a positive or negative icon in the Closed Tickets Log as illustrated in FIG. 7. This icon is automatically inserted next to the ticket number.

Figure 8:
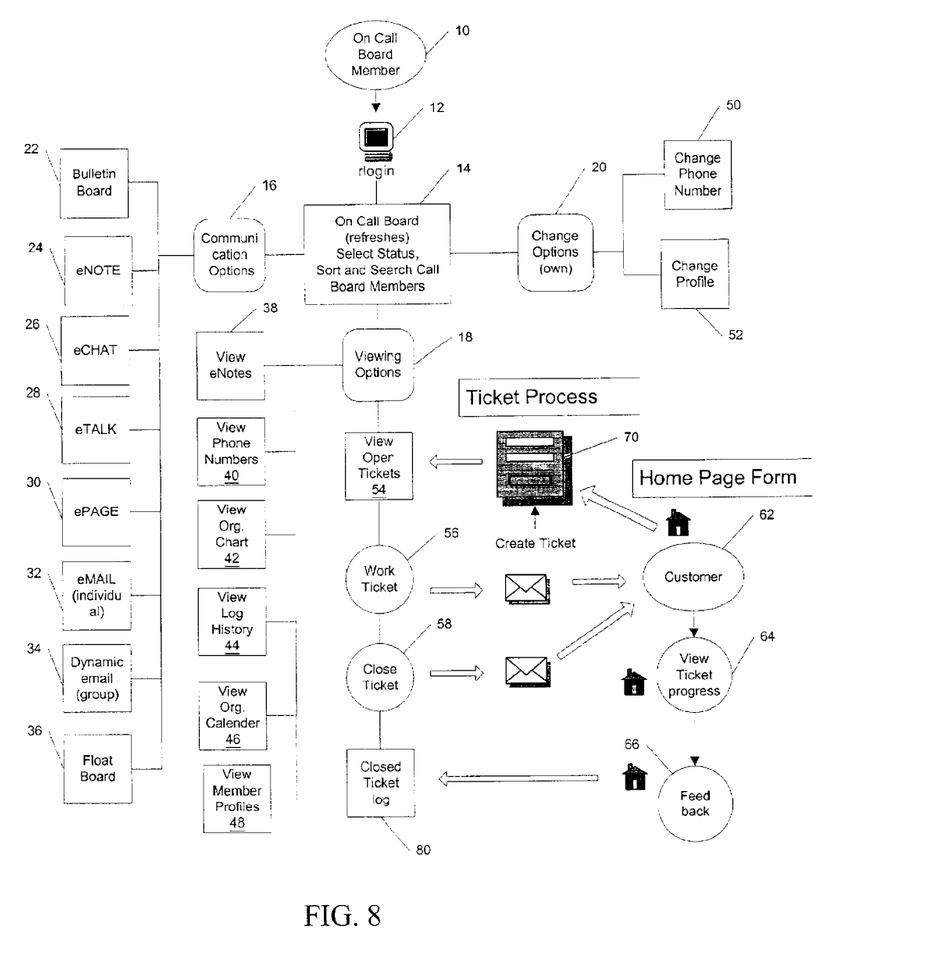
FIG. 8 illustrates a functional block diagram of the can tracking and resolution management system in accordance with an exemplary embodiment of the present invention.

FIG. 8 illustrates a functional block diagram of the call tracking and resolution management system. It shows both the On-Call Board member (employee) functional blocks and the customer functional blocks. The processing is initiated by an On-Call Board member 10 logging onto the call tracking and resolution management system server through login function 12. This login is done either via the Internet or an organization's intranet. The member is brought into the On-Call Board browser window. The On-Call Board graphical user interface shown in FIG. 1 is displayed to the member. The On-Call Board automatically refreshes at a presettable rate, but also will refresh when a feature is selected or a change is made to the On-Call Board, such as a change in status. As indicated in functional block 14, the member can update his status, or can sort and search for other On-Call Board members. The On-Call Board displays a listing or directory of all On-Call Board members or a preselected limited listing depending on role, location, and department. The member can sort from these dropdown selections and select the update button, further manipulating this listing or directory. Communications (both asynchronous and synchronous) options 16, viewing options 18 and change options 20 are three functional categories available for selection by the member. The member can change his contact phone number 50 for immediate contact by selecting the phone button for his entry on the On-Call Board display. The member can change his own profile 52 by selecting the hourglass icon located next to his name on the On-Call Board display.

The member can view the "Message of the Day", 150, which is prominently located above the listing and the bulletin board icon 102, the dynamic email icon 140, the organizational chart icon 106, and the organizational calendar icon 108. The member may select the JavaScript Side-Menu Bar 110, which pops open displaying a menu of options which are predetermined based on the member's permissions to these options.

The communications options (functional block 16) available to the member include bulletin board 22, send e-note 24, e-chat 26, e-talk 28, e-page 30, e-mail individual 32, e-mail group 34, and Float Board 36 (activated from pull down side menu in FIG. 1). The viewing options (functional block 18) available to the member include view e-notes 38, view phone numbers 40, view organization chart 42, view log history 44, view organization calendar 46 and view member profiles 48. The member can also view open call tickets 54, work an open call ticket 56, close a call ticket 58 and view the closed ticket log 60.

A call ticket is created (functional block 70) by a customer 62 logging onto the call tracking and resolution management system server which then becomes viewable by an assigned member as indicated in functional block 54. The ticket process begins when a customer fills out a web form requesting service. The member can also start a ticket. Once the customer submits a ticket, email containing a link to his ticket is automatically sent where the customer can view the progress of the ticket (functional block 64). Once an open ticket is closed, an additional email is sent to the customer which contains a link to the closed ticket, and also a link to a feedback web form where the customer can submit feedback (functional block 66). The closed ticket is transferred to a Closed Ticket log, which can be accessed from the SideMenu.

The call tracking and resolution management system of the present invention can be realized in software or a combination of hardware and software. Any kind of computer system or other apparatus adapted for carrying out the methods described herein is suited. A typical combination of hardware and software in this context could be a web-based server computer with a computer program that, when loaded and executed, controls the web-based server computer such that it carries out the methods described herein. The call tracking and resolution management system logic can also be embedded in a computer program product, which includes all the features enabling the implementation of the methods described herein, and which, when loaded in a computer system, is able to carry out these methods.

Additionally, the corresponding structures, materials, acts, and equivalents of all means plus function elements in any claims are intended to include any structure, material or acts for performing the functions in combination with other claim elements as specifically claimed.

Those skilled in the art will appreciate that many modifications to the exemplary embodiment of the present invention are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in imitation thereof since the scope of the present invention is defined solely by the appended claims.

What is claimed is:

1. A method for providing interactive, real-time call tracking and resolution management over a communications network, comprising the steps of:

providing an on-line call ticket request form for creating and submitting a call ticket for resolution;

generating and displaying an interactive, on-call board user interface that identifies a plurality of members that are assigned and available to respond to a call ticket from a customer, a present status of each member and a primary contact number;

automatically generating and displaying on the on-call board a plurality of icons representing communications options for each member based on the member's status; and providing a plurality of icons that are accessible to each member and that generate hyperlinks to a plurality of additional functions associated with call tracking and resolution.

2. The method for providing interactive, real-time call tracking and resolution management of claim 1 further comprising generating and displaying a dynamic permissions menu to a member.

3. The method for providing interactive, real-time call tracking and resolution management of claim 2 wherein the dynamic permissions menu provides hyperlinks to call tracking and resolution functions that the member is authorized to view.

4. The method for providing interactive, real-time call tracking and resolution management of claim 3 wherein the call tracking and resolution functions include create a ticket, open a ticket, close a ticket, and archive a ticket.

5. The method for providing interactive, real-time call tracking and resolution management of claim 3 wherein the call tracking and resolution functions include call board, customer account, management menu and administration menu.

6. The method for providing interactive, real-time call tracking and resolution management of claim 3 wherein the call tracking and resolution functions include a float board.

7. The method for providing interactive, real-time call tracking and resolution management of claim 6 wherein the float board function displays a list of members grouped by status and an e-chat and a phone contact icon next to each member's name, which enable a selected member to be contacted by phone, instant messaging and electronic mail.

8. The method for providing interactive, real-time call tracking and resolution management of claim 1 wherein the on-call board further comprises a selectable link to a member's assigned and open call tickets.

9. The method for providing interactive, real-time call tracking and resolution management of claim 1 wherein the plurality of additional functions include at least two of viewing personal electronic notes, viewing an organization chart, viewing an organization calendar, viewing a member's profile and viewing a ticket assigned to a member.

10. The method for providing interactive, real-time call tracking and resolution management of claim 1 wherein the communications options include at least two of a bulletin-board, electronic notes, instant messaging, voice over Internet Protocol (IP), electronic mail, dynamic electronic mail to a group of members, and a float board.

11. The method for providing interactive, real-time call tracking and resolution management of claim 1 further comprising the step of updating a member's primary contact phone number.

12. The method for providing interactive, real-time call tracking and resolution management of claim 1 further comprising the step of updating a member's profile.

13. The method for providing interactive, real-time call tracking and resolution management of claim 1 further comprising the step of sending an electronic notification to a customer with a link to the customer's call ticket to enable the customer to view a status of the call ticket.

14. The method for providing interactive, real-time call tracking and resolution management of claim 1 further comprising the step of sending an electronic notification to a customer when the customer's call ticket has been closed, the electronic notification including a link to a customer call ticket feedback form.

15. The method for providing interactive, real-time call tracking and resolution management of claim 14 further comprising the step of scoring each member's performance in responding to customer call tickets based on customer feedback forms.

16. A computer readable medium containing a computer program product for providing interactive, real-time call tracking and resolution management over a communications network, the computer program product comprising:
   program instructions that provide an on-line call ticket request form for creating and submitting a call ticket for resolution;
   program instructions that generate and display an interactive, on-call board user interface that identifies a plurality of members that are assigned and available to respond to a call ticket from a customer, a present status of each member and a primary contact number;
   program instructions that automatically generate and display on the on-call board a plurality of icons representing communications options for each member based on the member's status; and
   program instructions that provide a plurality of icons that are accessible to each member and that generate hyperlinks to a plurality of additional functions associated with call tracking and resolution.

17. The computer program product for providing interactive, real-time call tracking and resolution management of claim 16 further comprising program instructions that generate and display a dynamic permissions menu to a member.

18. The computer program product for providing interactive, real-time call tracking and resolution management of claim 16 wherein the dynamic permissions menu provides hyperlinks to call tracking and resolution functions that the member is authorized to view.

19. The computer program product for providing interactive, real-time call tracking and resolution management of claim 18 wherein the call tracking and resolution functions include program instructions that create a ticket, open a ticket, close a ticket, and archive a ticket.

20. The computer program product for providing interactive, real-time call tracking and resolution management of claim 18 wherein the call tracking and resolution functions include program instructions that generate a float board.

21. The computer program product for providing interactive, real-time call tracking and resolution management of claim 20 wherein the float board function includes program instructions that display a list of members grouped by status and an e-chat and a phone contact icon next to each member's name, which enable a selected member to be contacted by phone, instant messaging and electronic mail.

22. The computer program product for providing interactive, real-time call tracking and resolution management of claim 16 wherein the on-call board further comprises program instructions that enable a selectable link to a member's assigned and open call tickets.

23. The computer program product for providing interactive, real-time call tracking and resolution management of claim 16 wherein the plurality of additional functions include program instructions that enable viewing of at least two of personal electronic notes, an organization chart, an organization calendar, a member's profile and a ticket assigned to a member.

24. The computer program product for providing interactive, real-time call tracking and resolution management of claim 16 wherein the communications options include program instructions that enable at least two of a bulletin board, electronic notes, instant messaging, voice over Internet Protocol (IP), electronic mail, dynamic electronic mail to a group of members, and a float board.

25. The computer program product for providing interactive, real-time call tracking and resolution management of claim 16 further comprising program instructions that enable updating a member's primary contact phone number.

26. The computer program product for providing interactive, real-time call tracking and resolution management of claim 16 further comprising program instructions that enable updating a member's profile.

27. The computer program product for providing interactive, real-time call tracking and resolution management of claim 16 further comprising programs instructions that send an electronic notification to a customer with a link to the customer's call ticket to enable the customer to view a status of the call ticket.

28. The computer program product for providing interactive, real-time call tracking and resolution management of claim 16 further comprising programs instructions that send an electronic notification to a customer when the customer's call ticket has been closed, the electronic notification including a link to a customer call ticket feedback form.

29. The computer program product for providing interactive, real-time call tracking and resolution management of claim 28 further comprising programs instructions that score each member's performance in responding to customer call tickets based on customer feedback forms.

* * * * *

US006865268C1

(12) EX PARTE REEXAMINATION CERTIFICATE (6991st)

United States Patent
Matthews et al.

(10) Number: US 6,865,268 C1
(45) Certificate Issued: Aug. 11, 2009

(54) DYNAMIC, REAL-TIME CALL TRACKING FOR WEB-BASED CUSTOMER RELATIONSHIP MANAGEMENT

(75) Inventors: Charles Terence Matthews, Norcross, GA (US); John Michael Domjancic, Duluth, GA (US)

(73) Assignee: Vtrax Technologies, Inc., Braselton, GA (US)

Reexamination Request:
No. 90/010,348, Nov. 24, 2008

Reexamination Certificate for:
Patent No.: 6,865,268
Issued: Mar. 8, 2005
Appl. No.: 10/051,477
Filed: Jan. 16, 2002

Related U.S. Application Data

(60) Provisional application No. 60/261,421, filed on Jan. 16, 2001.

(51) Int. Cl.
*G06Q 10/00* (2006.01)

(52) U.S. Cl. .............................. 379/265.09; 379/88.17; 379/265.02

(58) Field of Classification Search .................. None
See application file for complete search history.

(56) References Cited

U.S. PATENT DOCUMENTS

| 5,465,286 | A | 11/1995 | Clare et al. |
| 5,754,636 | A | 5/1998 | Bayless et al. |
| 6,466,663 | B1 | 10/2002 | Ravenscroft et al. |
| 6,516,055 | B1 | 2/2003 | Bedeski et al. |
| 6,611,498 | B1 | 8/2003 | Baker et al. |
| 6,732,188 | B1 | 5/2004 | Flockhart et al. |
| 6,826,194 | B1 | 11/2004 | Vered et al. |

OTHER PUBLICATIONS

ACD Management Software: Getting the Most Out of Your ACD Software; Call Center Magazine; Feb. 1, 2999; Article ID=8701394.
AnswerSoft Unveils Concerto For Web–Based Call Centers; Newsbytes; Feb. 5, 1997.
Get Me the Guru!; Teleconnect Magazine; Jun. 1999; Text box on p. 75 (pp. 73–77 included).

*Primary Examiner*—Colin M Larose (57) ABSTRACT

A method and computer product for locating and tracking the status of call tickets, communicating both asynchronously and synchronously with online members within an organization through an interactive, web-based, on-call board application. Members are provided with access to static and dynamic organizational information with a multi-level access control. An on-call board display is driven by preset permissions, department settings, and member inputs. A member of the organization selects status options and inputs information that dynamically drives the on-call board for each refresh cycle. Members are set to different permission levels, thereby controlling access to various icons, links, features or functions. The display of the number of call ticket requests for a listing of members is integrated into the on-call board. This integration further allows for a visual display of current tickets that are assigned to each member. A float board provides links to electronic mail and phone numbers for each individual member. A dynamic mailing list enables instant selection of mailing recipients through a member sorting template. Customer feedback scoring is automatically generated for each member based on the satisfaction feedback input received from customers on closed call tickets.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 16 is confirmed.

Claim 18 is determined to be patentable as amended.

Claims 19–21, dependent on an amended claim, are determined to be patentable.

Claims 2–15, 17 and 22–29 were not reexamined.

18. The computer program product for providing interactive, real-time call tracking and resolution management of claim [16] *17* wherein the dynamic permissions menu provides hyperlinks to call tracking and resolution functions that the member is authorized to view.

\* \* \* \* \*

(12) EX PARTE REEXAMINATION CERTIFICATE (9152nd)
United States Patent
Matthews et al.

(10) Number: US 6,865,268 C2
(45) Certificate Issued: Jul. 24, 2012

(54) DYNAMIC, REAL-TIME CALL TRACKING FOR WEB-BASED CUSTOMER RELATIONSHIP MANAGEMENT

(75) Inventors: Charles Terence Matthews, Norcross, GA (US); John Michael Domjancic, Duluth, GA (US)

(73) Assignee: Vtrax Technologies Inc., Jupiter, FL (US)

Reexamination Request:
No. 90/009,940, Aug. 8, 2011

Reexamination Certificate for:
Patent No.: 6,865,268
Issued: Mar. 8, 2005
Appl. No.: 10/051,477
Filed: Jan. 16, 2002

Reexamination Certificate C1 6,865,268 issued Aug. 11, 2009

Related U.S. Application Data

(60) Provisional application No. 60/261,421, filed on Jan. 16, 2001.

(51) Int. Cl.
*G06Q 10/00* (2006.01)

(52) U.S. Cl. ............................... 379/265.09; 379/88.17; 379/265.02

(58) Field of Classification Search ........................ None
See application file for complete search history.

(56) References Cited

To view the complete listing of prior art documents cited during the proceeding for Reexamination Control Number 90/009,940, please refer to the USPTO's public Patent Application Information Retrieval (PAIR) system under the Display References tab.

*Primary Examiner* — Salman Ahmed (57) ABSTRACT

A method and computer product for locating and tracking the status of call tickets, communicating both asynchronously and synchronously with online members within an organization through an interactive, web-based, on-call board application. Members are provided with access to static and dynamic organizational information with a multi-level access control. An on-call board display is driven by preset permissions, department settings, and member inputs. A member of the organization selects status options and inputs information that dynamically drives the on-call board for each refresh cycle. Members are set to different permission levels, thereby controlling access to various icons, links, features or functions. The display of the number of call ticket requests for a listing of members is integrated into the on-call board. This integration further allows for a visual display of current tickets that are assigned to each member. A float board provides links to electronic mail and phone numbers for each individual member. A dynamic mailing list enables instant selection of mailing recipients through a member sorting template. Customer feedback scoring is automatically generated for each member based on the satisfaction feedback input received from customers on closed call tickets.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-4, 6-8, 10-12, 15-22 and 24-29 are determined to be patentable as amended.

Claims 5, 9, 13, 14 and 23, dependent on an amended claim, are determined to be patentable.

1. A method for providing interactive, real-time call tracking and resolution management over a communications network, comprising the steps of:
   providing an on-line call ticket request form for creating and submitting a call ticket for resolution;
   generating and displaying *individually to a plurality of members on a display device of each member* an interactive, on-call board user interface *window* that identifies [a plurality of] members that are assigned and available to respond to a call ticket from a customer, *a number of call tickets assigned to each member*, a present status of each member and a primary [contact] *phone* number *designated by each member corresponding to a voice communication device located at an office or non-office location where the member can most likely be communicated with via the voice communication device*;
   automatically generating and displaying on the on-call board *user interface window* a plurality of icons representing communications options for each member based on the member's status; and
   providing a plurality of icons *on the on-call board user interface window* that are accessible to each member and that generate hyperlinks to a plurality of additional functions associated with call tracking and resolution.

2. The method for providing interactive, real-time call tracking and resolution management of claim 1 further comprising generating and displaying a dynamic permissions menu *on the on-call board user interface window* to a member *including content identifying only functions for selection by the member for which permission data indicates that the member has been granted permission to use*.

3. The method for providing interactive, real-time call tracking and resolution management of claim 2 wherein the dynamic permissions menu provides hyperlinks to call tracking and resolution functions *only for which permission data indicates* that the member [is authorized to view] *has been granted permission to use*.

4. The method for providing interactive, real-time call tracking and resolution management of claim 3 wherein the call tracking and resolution functions *of the dynamic permissions menu* include create a ticket, open a ticket, close a ticket, and archive a ticket.

6. The method for providing interactive, real-time call tracking and resolution management of claim 3 wherein the call tracking and resolution functions *of the dynamic permissions menu* include a float board *user interface window*.

7. The method for providing interactive, real-time call tracking and resolution management of claim 6 wherein the float board [function] *user interface window* displays a list of members grouped by status and an e-chat and a phone contact icon next to each member's name, which enable a selected member to be contacted by phone, instant messaging and electronic mail.

8. The method for providing interactive, real-time call tracking and resolution management of claim 1 wherein the on-call board *user interface window* further comprises a selectable link to a member's assigned and open call tickets.

10. The method for providing interactive, real-time call tracking and resolution management of claim 1 wherein the communications options include at least two of a bulletinboard, electronic notes, instant messaging, voice over Internet Protocol (IP), electronic mail, dynamic electronic mail to a group of members, and a float board *user interface window*.

11. The method for providing interactive, real-time call tracking and resolution management of claim 1 further comprising the step of updating a member's primary [contact] phone number.

12. The method for providing interactive, real-time call tracking and resolution management of claim 1 further comprising the step of updating a member's profile *in response to receiving selection of an icon located on the on-call board user interface window and associated with updating of a member's profile*.

15. The method for providing interactive, real-time call tracking and resolution management of claim 14 further comprising the [step] *steps* of scoring each member's performance in responding to customer call tickets based on customer feedback forms, *and inserting icons adjacent call ticket numbers in a closed tickets log indicating the receipt of positive or negative feedback from the customer feedback forms*.

16. A computer readable medium containing a computer program product for providing interactive, real-time call tracking and resolution management over a communications network, the computer program product comprising:
   program instructions that provide an on-line call ticket request form for creating and submitting a call ticket for resolution;
   program instructions that generate and display *individually to a plurality of members on a display device of each member* an interactive, on-call board user interface *window* that identifies [a plurality of] members that are assigned and available to respond to a call ticket from a customer, *a number of call tickets assigned to each member*, a present status of each member and a primary [contact] *phone* number *designated by each member corresponding to a voice communication device located at an office or non-office location where the member can most likely be communicated with via the voice communication device*;
   program instructions that automatically generate and display on the on-call board *user interface window* a plurality of icons representing communications options for each member based on the member's status; and
   program instructions that provide a plurality of icons *on the on-call board user interface window* that are accessible to each member and that generate hyperlinks to a plurality of additional functions associated with call tracking and resolution.

17. The computer program product for providing interactive, real-time call tracking and resolution management of claim 16 further comprising program instructions that generate and display a dynamic permission menu *on the on-call board user interface window* to a member *including content identifying only functions for selection by the member for which permission data indicates that the member has been granted permission to use.*

18. The computer program product for providing interactive, real-time call tracking and resolution management of claim 17 wherein the dynamic permissions menu provides hyperlinks to call tracking and resolution functions *only for which permission data indicates* that the member [is authorized to view] *has been granted permission to use.*

19. The computer program product for providing interactive, real-time call tracking and resolution management of claim 18 wherein the call tracking and resolution functions *of the dynamic permission menu* include program instructions that create a ticket, open a ticket, close a ticket, and archive a ticket.

20. The computer program product for providing interactive, real-time call tracking and resolution management of claim 18 wherein the call tracking and resolution functions *of the dynamic permissions menu* include program instructions that generate a float board *user interface window.*

21. The computer program product for providing interactive, real-time call tracking and resolution management of claim 20 wherein the float board [function includes program instructions that display] *user interface window displays* a list of members grouped by status and an e-chat and a phone contact icon next to each member's name, which enable a selected member to be contacted by phone, instant messaging and electronic mail.

22. The computer program product for providing interactive, real-time call tracking and resolution management of claim 16 wherein the on-call board *user interface window* further comprises [program instructions that enable] a selectable link to a member's assigned and open call tickets.

24. The computer program product for providing interactive, real-time call tracking and resolution management of claim 16 wherein the communications options include program instructions that enable at least two of a bulletin board, electronic notes, instant messaging, voice over Internet Protocol (IP), electronic mail, dynamic electronic mail to a group of members, and a float board *user interface window.*

25. The computer program product for providing interactive, real-time call tracking and resolution management of claim 16 further comprising program instructions that enable updating a member's primary [contact] phone number.

26. The computer program product for providing interactive, real-time call tracking and resolution management of claim 16 further comprising program instructions that enable updating a member's profile *in response to receiving selection of an icon located on the on-call board user interface window and associated with updating of a member's profile.*

27. The computer program product for providing interactive, real-time call tracking and resolution management of claim 16 further comprising [programs] *program* instructions that send an electronic notification to a customer with a link to the customer's call ticket to enable the customer to view a status of the call ticket.

28. The computer program product for providing interactive, real-time call tracking and resolution management of claim 16 further comprising [programs] *program* instructions that send an electronic notification to a customer when the customer's call ticket has been closed, the electronic notification including a link to a customer call ticket feedback form.

29. The computer program product for providing interactive, real-time call tracking and resolution management of claim 28 further comprising [programs] *program* instructions that score each member's performance in responding to customer call tickets based on customer feedback forms *and that insert icons adjacent call ticket numbers in a closed tickets log indicating the receipt of positive or negative feedback from the customer feedback forms.*

* * * * *